United States Patent [19]
Leete

[11] Patent Number: 5,101,862
[45] Date of Patent: Apr. 7, 1992

[54] ROTARY ACTUATOR AND VALVE CONTROL SYSTEM

[76] Inventor: Barrett C. Leete, 3065 Roaring Brook Rd., Killington, Vt. 05751

[21] Appl. No.: 742,114

[22] Filed: Aug. 8, 1991

[51] Int. Cl.⁵ .................. G05D 7/00; G05D 16/00; F01C 9/00; F16K 31/12
[52] U.S. Cl. .................. 137/899; 137/486; 137/487.5; 251/59; 92/122; 92/125
[58] Field of Search ............ 251/59; 92/122, 125; 137/486, 487.5, 899

[56] References Cited

U.S. PATENT DOCUMENTS

| | | | |
|---|---|---|---|
| 1,646,631 | 10/1927 | Schnyder | 251/59 X |
| 2,152,651 | 4/1939 | Kinzie | 251/59 |
| 2,168,255 | 8/1939 | Bischoff | 251/59 X |
| 2,435,968 | 2/1948 | Kalix | 137/502 |
| 2,463,931 | 3/1944 | Wyckoff | 92/122 X |
| 3,110,228 | 11/1963 | Ahramo | 91/48 |
| 3,225,785 | 12/1965 | Goike | 137/489 X |
| 3,688,645 | 9/1970 | Reaves | 251/59 X |
| 3,752,041 | 9/1973 | Smith | 251/59 |
| 3,977,648 | 8/1976 | Sigmon | 251/59 |
| 4,069,292 | 1/1978 | Herrington | 137/487.5 X |
| 4,655,252 | 4/1987 | Krumhansl | 251/59 X |
| 4,702,273 | 10/1987 | Allen | 137/487.5 |
| 4,716,996 | 1/1988 | Hummel | 92/122 X |
| 4,798,527 | 1/1989 | Gunda | 137/487.5 X |
| 4,887,636 | 12/1989 | Rothen | 137/487.5 |
| 5,000,224 | 3/1991 | Olson | 137/487.5 X |

Primary Examiner—Alan Cohan
Attorney, Agent, or Firm—Salzman & Levy

[57] ABSTRACT

An oscillatory rotary actuator is provided for controlling an adjustable valve. The actuator comprises a freely rotating, cylindrical housing with concentric inner and outer walls about its center. The housing has at least one depending vane, which functions as a rotary piston, that is radially disposed between the inner and outer walls. The rotary actuator further comprises an annular chamber casing which has two concentric walls that are designed to mate between the inner and outer walls of the housing member to receive the depending vane(s) between the concentric walls of the chamber casing. At least one radially extending chamber wall is interposed and attached to the concentric walls of the chamber casing. When the housing member is fitted over or receives the annular chamber casing, the housing, chamber casing and chamber wall collectively form at least one rotary chamber for the arcuate movement of the depending vane, or rotary piston, therein. A valve control system is also provided for the operation of an adjustable valve for controlling the flow of fluid therethrough from a control module located at a distance from the valve. The valve can be operated as a function of a desired valve position utilizing actuator position feedback sensing; desired fluid pressure utilizing pressure feedback sensing; or desired fluid flow rate utilizing flow feedback sensing.

The adjustable valve is preferably one that has a quarter turn from the open to the close position, such as a ball valve or butterfly valve.

44 Claims, 7 Drawing Sheets

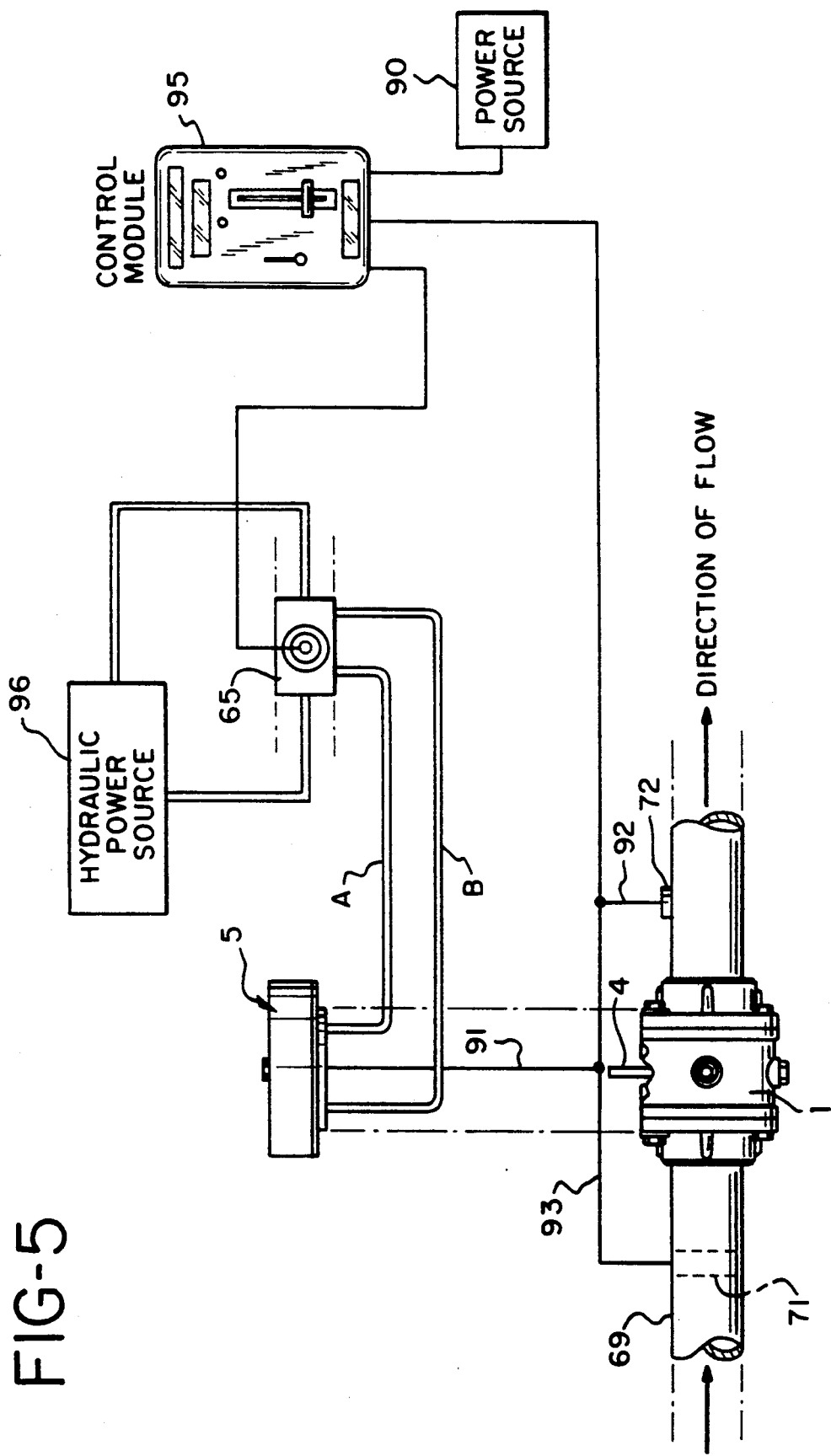

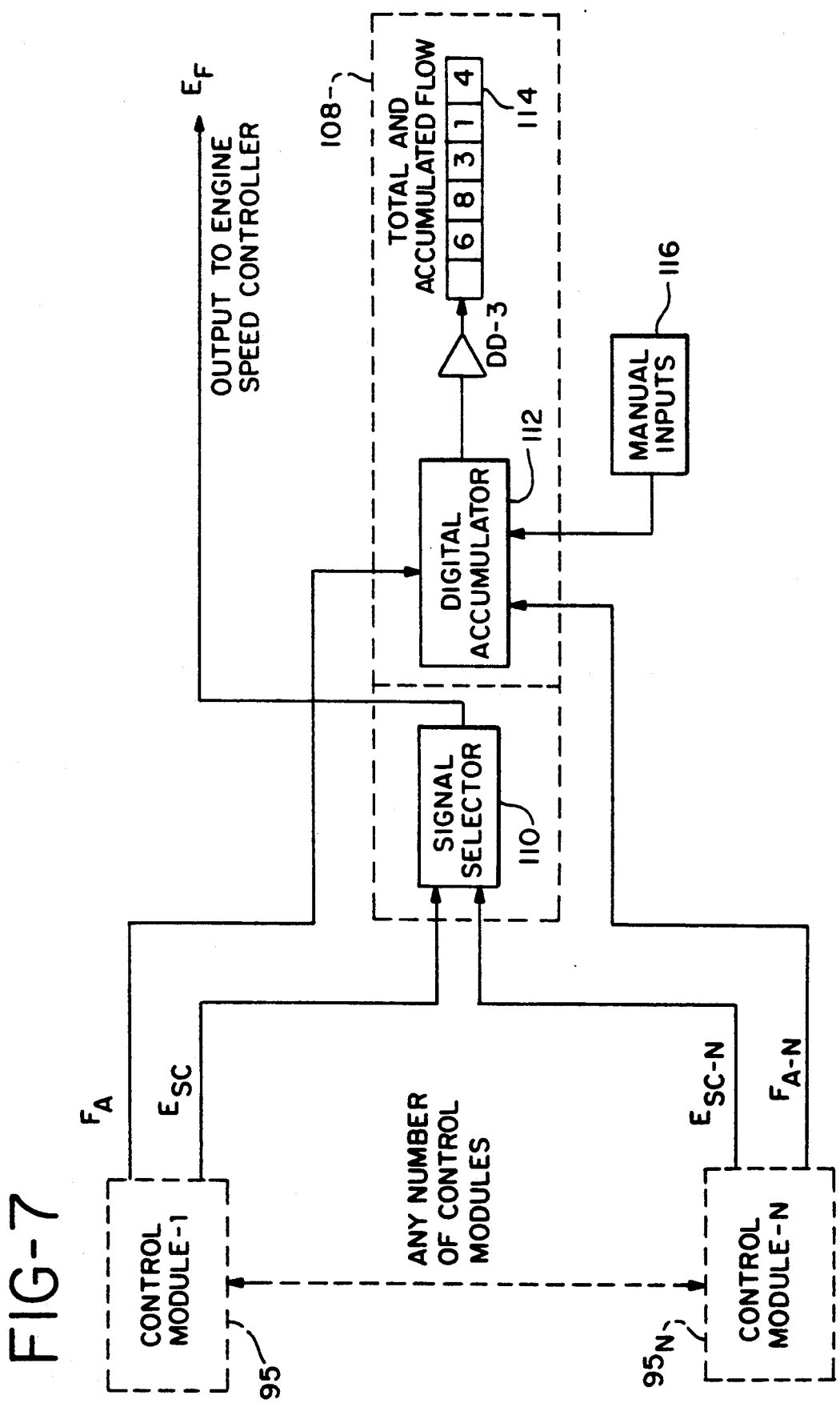

ROTARY ACTUATOR AND VALVE CONTROL SYSTEM

BACKGROUND OF THE INVENTION

The present invention relates to an oscillatory rotary actuator for the control of an adjustable valve, and more particularly to a system for controlling an adjustable valve, or series of such valves, from a central point or control panel located at a distance from the valve or series of valves.

For purposes of this invention, an adjustable valve is defined as one that can operate from a fully open to a fully closed position, and vice versa, by the arcuate movement or oscillation of the rotary piston(s) within the rotary actuator herein. The adjustable valve is preferably one that requires a rotation of less than 360° to open and close the valve. Thus, the present invention will operate with a quarter turn valve, that is, one having a ninety degree turn from its open to close position, such as a ball valve or butterfly valve, or the like.

The present invention is generally applicable to remotely controlling an adjustable valve with a rotary actuator for regulating the flow of a fluid through a conduit in which the valve is interposed, although it is envisioned that the invention can be extended to the applications which require remote rotary actuation. The invention has particular application to the fire fighting industry, and more specifically for use on fire fighting vehicles that generally employ a complex system of pumps, valves and hoses for receiving and dispensing a fluid, commonly water, from and to various points located throughout the vehicle. The preferred valve used on fire trucks for controlling and dispensing water through the hose or conduit is a quarter turn ball valve.

The nature of a fire fighting vehicle is such that it generally contains a water discharge manifold located at a central pumping station for dispensing water through a series of lines that are controlled by multiple valves which are usually manually operated. Often times these valves, commonly ball valves, have to be operated in simultaneous fashion, requiring assigned manpower to monitor and control the various pressure and flow gauges to distribute the water as demanded by the multiple hoses or lines required to extinguish a fire. Thus, constant surveillance of the water pumping station, and each of the valves controlling the line pressures and water flow for the hoses employed, is necessary if the fire fighting apparatus is to operate in a safe and efficient manner. If there is a breakdown in any one of the lines, for example a ruptured hose, a quick and reliable shutdown of the respective line must be accomplished to ensure the safety of fire fighting personnel.

Moreover, when circumstances warrant, a rapid shutdown of a hose or line operating at or near full capacity must be accomplished in a manner that will avoid the severe back pressure that can cause a supply line or hose to rupture, or can damage a municipal water supply main if the line is connected thereto. Operators or attendants monitoring the pumping station of the fire truck often do not have advance warning to accommodate a sudden increase or decrease in line pressure either because of their remoteness from the control location or simply because of the timing involved in being able to adjust the pump pressure. The National Fire Protection Association (N.F.P.A.) has recently adopted standards requiring minimum operating times for the closing of valves on fire fighting apparatus.

In order to overcome the foregoing difficulties, a system is required whereby the pressures and/or flow rates of the individual valved lines emanating from the discharge pump of a fire fighting vehicle can be continuously and automatically monitored and controlled from a single location on the vehicle, or for that matter from multiple points or locations on the truck, so that individual line pressures and fluid flows can be remotely set and maintained to desired levels or positions as circumstances warrant.

Also required is an actuating apparatus for the control of each valve that is simple and compact in design, and which can be operatively connected to the valve in question without a significant demand for space on the fire fighting vehicle or a disassembly of the valve or line in question.

Many types of rotary actuators have been disclosed in the past, but they have been cumbersome, complex, and/or too costly to accommodate the control valves employed on a fire fighting vehicle. Actuators of this type are illustrated, for example, in Kinzie et al. U.S. Pat. No. 2,152,651 and in Sigmon U.S. Pat. No. 3,977,648.

Another drawback is that the inherent design of some rotary actuators is inefficient in terms of the power or hydraulic pressure needs to operate the actuator when torque demands for actuating the valve are high, usually when the fluid flowing through the valve is under a high amount of pressure. See, for example, Kalix U.S. Pat. No. 2,435,968; Shramo et al. U.S. Pat. No. 3,110,228; Reaves U.S. Pat. No. 3,688,645; to Reaves; and Smith U.S. Pat. No. 3,752,041.

A further obstacle is that other rotary actuators have been designed to be an inherent element of the valve for which they are meant to control, such as in Schnyder U.S. Pat. No. 1,646,631; Bischoff U.S. Pat. No. 2,168,255; Krumhansl U.S. Pat. No. 4,655,252; and in German Patent 2,011,639. These actuators work contrary to the "add-on" principle that is often mandated by the system utilized on a fire fighting vehicle. In other words, it is highly desirable for an actuator to simply be added to the existing valve hardware on a fire fighting vehicle, as opposed to having to disassemble or redesign the valve to incorporate or combine the actuator with the respective valve(s).

Automation or semi-automation of the valve system on a fire truck is also highly desirable for the safe and efficient operation of the truck and apparatus when it is being used to extinguish a fire. Various systems for the automatic control of a valve to regulate a continuous and/or intermittent flow of fluid through a conduit have been disclosed in the past, such as in Goike U.S. Pat. No. 3,225,785; Herrington et al. U.S. Pat. No. 4,069,292; Allen et al. U.S. Pat. No. 4,702,273; Gunda U.S. Pat. No. 4,798,527; Rothen U.S. Pat. No. 4,887,636; Olson, Jr. et al. U.S. Pat. No. 5,000,224 and pages 14–15 of "Fire Research News", Vol. 2, No. 1 (1988). The systems disclosed in the these publications, while utilizing pressure sensing means or flow sensing means, as may be the case, to invariably control the operation of a valve, are complex and therefore unreliable and/or inefficient to satisfy the operational and safety demands required of a system employed in fire equipment water control systems. They would additionally be inappropriate when used in conjunction with the rotary actuator according to the invention herein. Accordingly, there continues to be a need for an inexpensive, but highly effective and reliable apparatus and system for controlling an adjustable valve to regulate the flow of a fluid through a conduit or line, such as that utilized in fire equipment and fire fighting vehicles.

It is therefore an object of the present invention to provide an apparatus that will serve as an actuator for controlling the operation of an adjustable valve.

It is another object of the invention to provide an actuator that is relatively simple in design and operation.

It is yet another object of the invention to provide an actuator that can be retrofitted to an adjustable valve without a disassembly or change in design of the valve.

It is a further object of the invention to provide an actuator for the control of an adjustable valve so that the valve, or series of valves, can be operated from a single location at a distance from the valve(s) itself.

Another object of the invention is to provide a valve control system for remotely operating a valve, or series of valves, from a single location or control panel, to safely and reliably regulate the flow of a fluid through a conduit.

A further object is to provide a valve control system that will automatically regulate and monitor the flow of fluid through a conduit in response to a predetermined valve position setting; a predetermined fluid pressure setting; and/or a desired fluid flow rate setting.

And another object of the invention is to provide a valve control system that can be operated from any of a plurality of control panels strategically located to improve operational safety and efficiency, especially as it relates to systems on fire fighting vehicles.

These and other objects and features of the invention will become more readily understood from the following detailed description of the various meets and bounds of the invention in conjunction with the accompanying drawings.

SUMMARY OF THE INVENTION

In accordance with the present invention, there is provided an oscillatory rotary actuator comprising a freely rotating, cylindrical housing with concentric inner and outer walls about its center. The housing comprises at least one depending vane, which functions as a rotary piston, that is radially interposed between the inner and outer walls.

The rotary actuator additionally comprises an annular chamber casing which also has two concentric walls that are designed to mate between the inner and outer walls of the housing member to receive the depending vane(s) between the concentric walls of the chamber casing. At least one radially extending chamber wall is interposed and attached to the concentric wall of the chamber casing. When the housing member is fitted over or receives the annular chamber casing, the housing, chamber casing and chamber wall collectively form at least one rotary chamber for the arcuate movement of the depending vane, or rotary piston, therein.

In order to cause the depending vane to move in an arcuate fashion within the rotary chamber, the rotary chamber has a pair of openings for selectively admitting pressurized fluid into and from the rotary chamber. The openings in the chamber are arranged in such a manner that admission of pressurized fluid into the first opening of the pair of openings will cause the arcuate motion of the depending vane in a direction away from the first opening while causing the fluid on the other side of the vane to exit through the second opening. Conversely, admission of pressurized fluid through the second opening will cause the vane to oscillate in the reverse direction away from the second opening while causing pressurized fluid to exit through the first opening. Oscillation of the depending vane or rotary piston within the rotary chamber is thereby achieved.

The housing member is preferably designed and adapted to be operatively connected to the stem, or trunion, of an adjustable valve in such a manner that any rotation of the housing will cause the valve stem, and hence the valve mechanism, to move in a similar fashion.

In addition to the housing and annular chamber casing members, the actuator also has a mechanism for statically fixing the chamber casing preferably with respect to the adjustable valve, and a mechanism for containing the chamber casing within the housing member to provide a rotary actuator having at least one fluid pressurized rotary chamber.

Appurtenant to the foregoing elements and to facilitate the operation of the actuator, the actuator further comprises a seal interposed at the interface of the housing and chamber members to prevent the escape and transfer of pressurized fluid contained therein; seal about the edges of the depending vane to prevent the transfer of pressurized fluid in the rotary chamber from one side of said vane to the other; a seal on the exposed edge of the rotary chamber wall to prevent the transfer of pressurized fluid from one side of said wall to the other; and bearings to facilitate the oscillatory, rotational movement of the housing member with respect to the annular chamber casing.

Operation of the actuator is made possible by the provision of a pair of conduits that communicate with the respective openings in the rotary chamber and a source of pressurized fluid to arcuately oscillate the depending vane within the rotary chamber. As already indicated, the actuator is preferably designed to mount directly onto the body of an adjustable valve whose stem or trunion is operated in an oscillatory manner by the rotational movement of the housing member caused by the fluid pressure acting on the depending vane within the rotary chamber.

The adjustable valve is preferably one that has a quarter turn from the open to the close position, such as a ball valve or butterfly valve. It is therefore understood that the rotary chamber or plurality of rotary chambers selected for the actuator is such that the arcuate movement of the depending vane in either direction will be capable of causing the stem of an adjustable valve to turn from a completely open to a completely closed position, and vice versa.

A greater number of depending vanes and corresponding rotary chambers can be used depending on the amount of torque required to turn the valve in question under varying flow conditions. This will also depend on the size and capacity of the valve. One of the advantages of arranging the depending vane(s) in an annular rotary chamber according to the invention herein is that it significantly increases the amount of torque to the actuator because of the distance, or lever arm, that is offered between the vanes and the valve stem without necessarily increasing the volume of pressurized fluid required to actuate the vanes.

Another aspect of the invention is the provision of a valve control system for operating an adjustable valve from a control module disposed at a distance from the valve(s). Three modes of operation for the system are contemplated: valve position mode utilizing actuator position feedback sensing; automatic mode utilizing pressure feedback sensing; and automatic mode utilizing flow feedback sensing. The control module, which can be positioned at any distance from the valve location, includes electronic circuitry for each of these modes of operation. Each valve is assigned its own control module when there is more than one valve to be controlled. Moreover, all of the control modules can be integrated and arranged under a single control panel which can be positioned at a single location for controlling all of the valves. The invention also includes the provision of a series of control panels located at strategic location and electronically linked to each other so that all of the valves can be controlled from different locations.

In the valve position mode, a predetermined position or opening for an adjustable valve is set by hand to admit a flow of fluid therethrough from a pumping source. A reference signal that reflects or is proportional to the desired valve setting, is then generated by a controller within the control module. A feedback sensor, such as a potentiometer, for generating and transmitting a feedback signal reflective of the actual position of the rotary actuator, and thus the valve position, is provided to enable the controller to receive the feedback signal and to compare it with the reference signal. The controller in turn generates an output signal that represents the difference between the reference and feedback signals, and then transmits this output signal to a regulator, such as a solenoid valve, for regulating the flow of pressurized fluid to the respective openings of the rotary actuator to oscillate the depending vane(s). The degree of oscillation of the depending vane(s), and hence the opening or closing of the adjustable valve, reflects the output signal transmitted to the regulator.

The automatic pressure sensing mode performs in a manner similar to the manual mode of operation described above with the exception that opening or closing the adjustable valve, and thus the operation of the actuator, is made a function of a pressure sensor located downstream of the adjustable valve. In this case, the function of the position feedback sensor of the rotary actuator is obviated.

In like fashion, the automatic flow sensing mode is identical in operation to the pressure sensing mode with the exception that a flow sensor is used instead of the pressure sensor. The flow sensor is capable of producing a signal that reflects the flow rate of fluid through the valved line.

With this system, the adjustable valve can be remotely set, maintained and monitored as a function of a desired valve position, line pressure or line flow rate. Additionally, the pressure sensing and flow sensing modes can operate concurrently in order to give a simultaneous and continuous reading or display of both parameters on the control module.

BRIEF DESCRIPTION OF THE DRAWINGS

A more detailed understanding of the present invention may be obtained by reference to the accompanying drawings when taken in conjunction with the detailed description thereof and in which:

FIG. 5 is a functional schematic plan view of the valve control system according to the present invention.

FIG. 7 is an electrical schematic for a plurality of each control module illustrated in FIG. 6 showing a combination of selected output signals for use on a fire fighting vehicle.

DESCRIPTION OF THE PREFERRED EMBODIMENT

The Rotary Actuator

Figure 1:
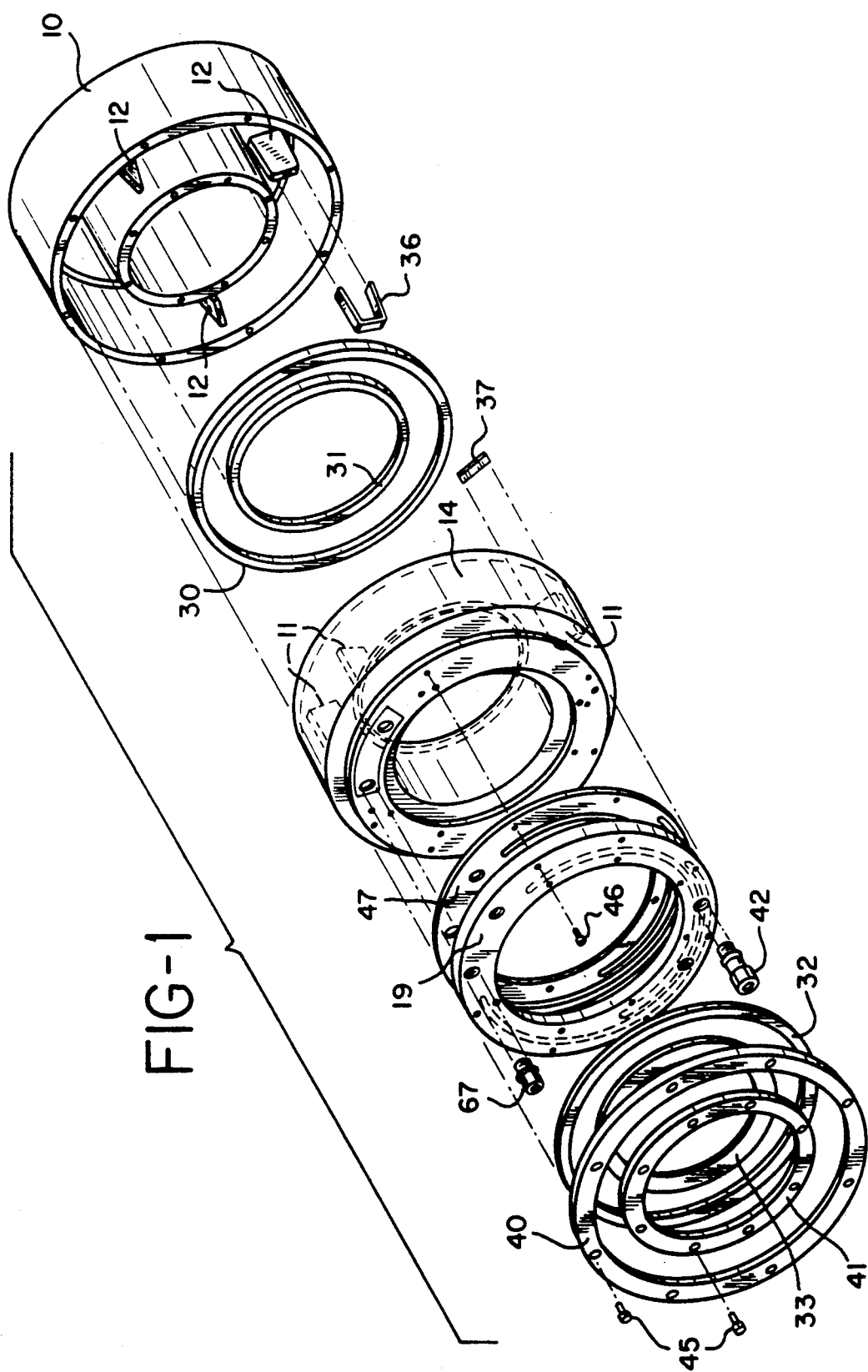
FIG. 1 is a three-quarter exploded perspective view of a rotary actuator assembly having three rotary chambers, a control chamber, and an annular fluid distribution chamber concentrically joined to the bottom of the rotary actuator in accordance with the invention herein.
Figure 2:
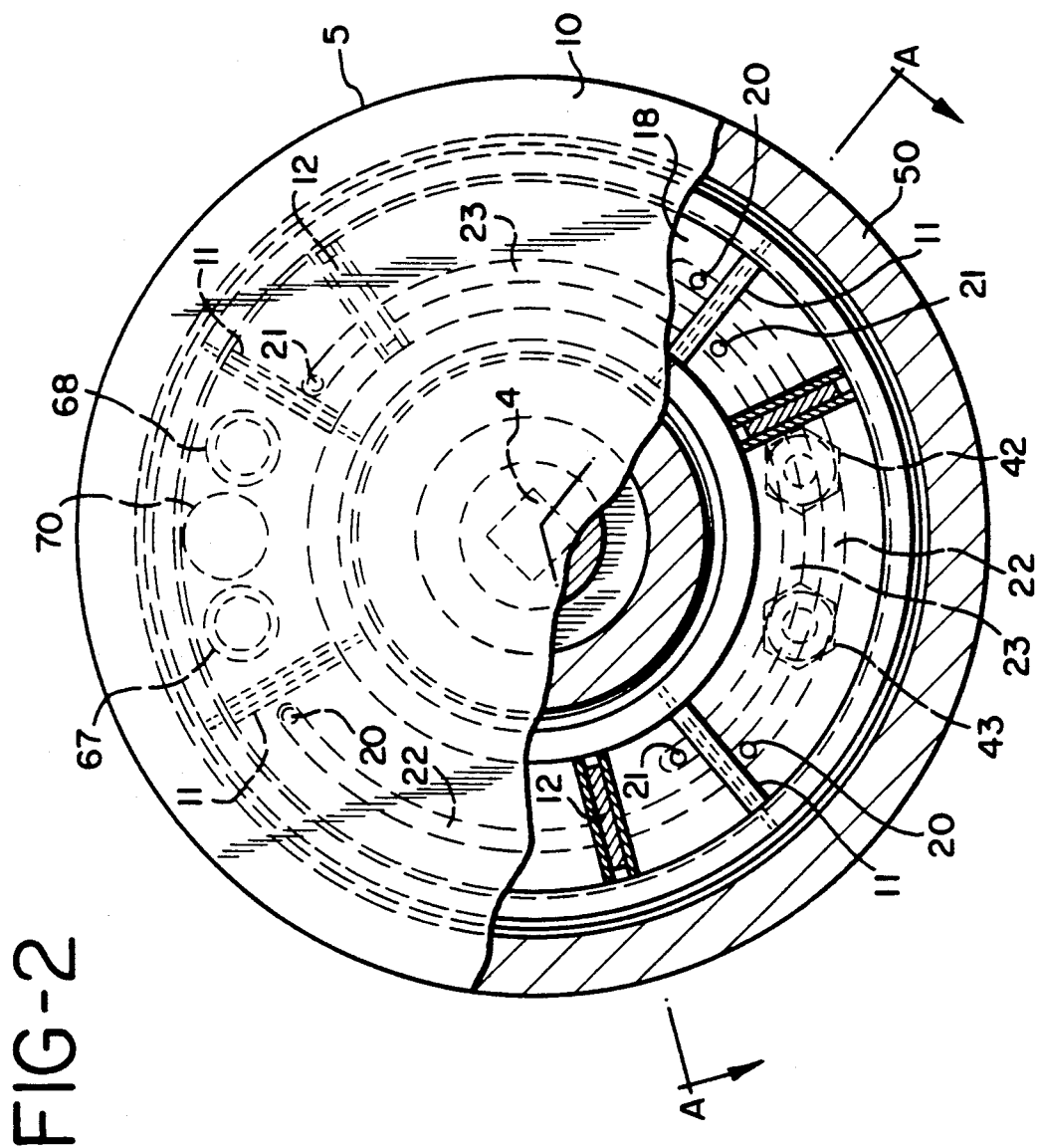
FIG. 2 is a top plan view of the rotary actuator in assembled form shown in FIG. 1 with a partial section of the top of the housing removed.

Referring now to the drawings, and in particular to FIGS. 1 through 4, a preferred embodiment of a rotary actuator 5 is illustrated which generally comprises a cylindrical, freely rotating cover or housing member 10 in the form of a sleeve that is concentrically mounted over an annular chamber casing member 14. Chamber casing 14 is designed to be stationary with respect to the valve which the rotary actuator is meant to control. In the preferred embodiment, chamber casing 14 is secured to a ball valve 1 (see FIG. 5) via a mounting bracket (not shown). The housing 10 is designed to be operatively connected to the stem of an adjustable valve, and in the embodiment shown, housing 10 receives valve stem 4 of ball valve 1 in recessed socket 3 (FIG. 3) to rotate the valve stem for the opening and closing of the ball valve.

Figure 3:
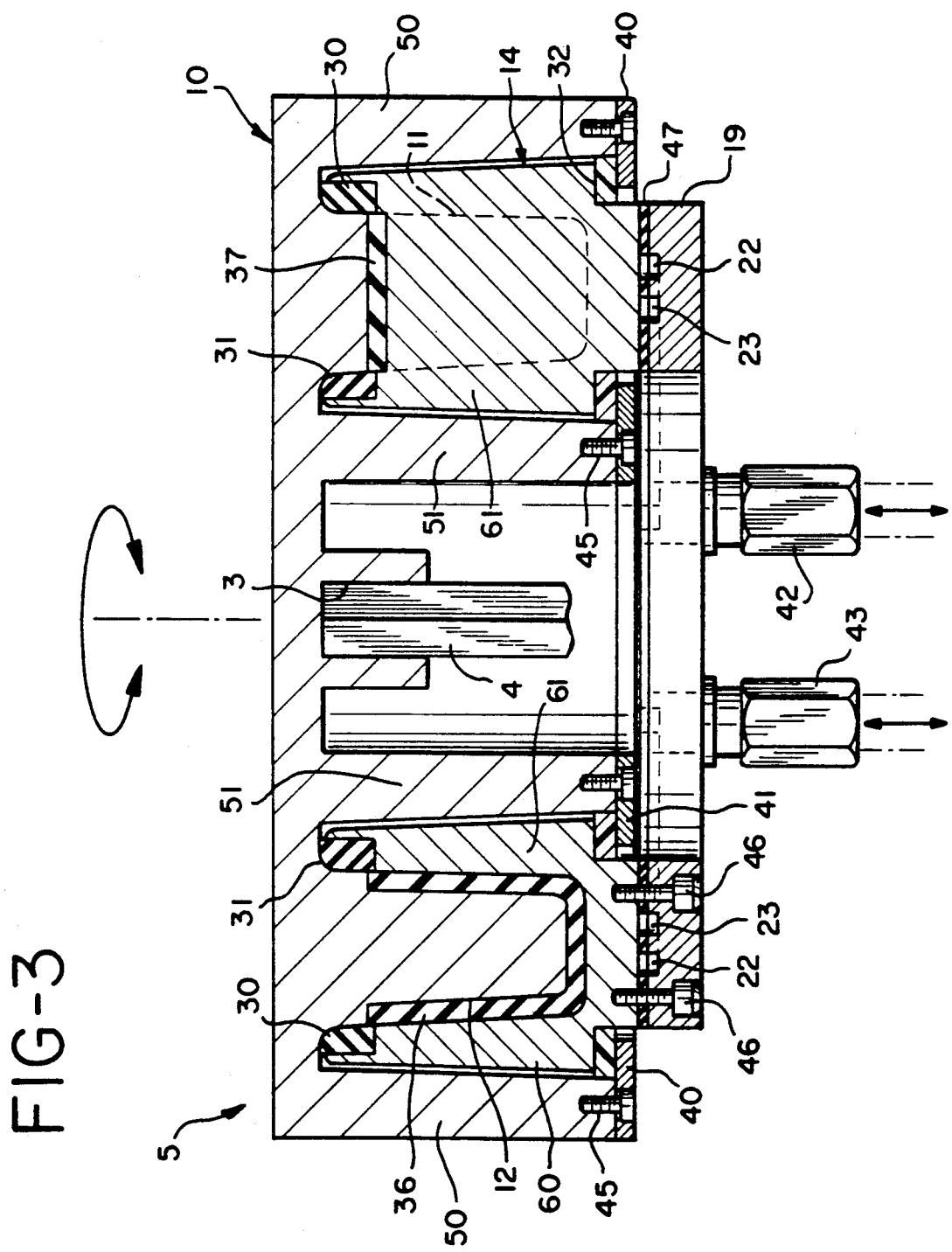
FIG. 3 is a vertical cross sectional view of the rotary actuator in assembled form taken at line A—A set forth in FIG. 2.
Figure 4:
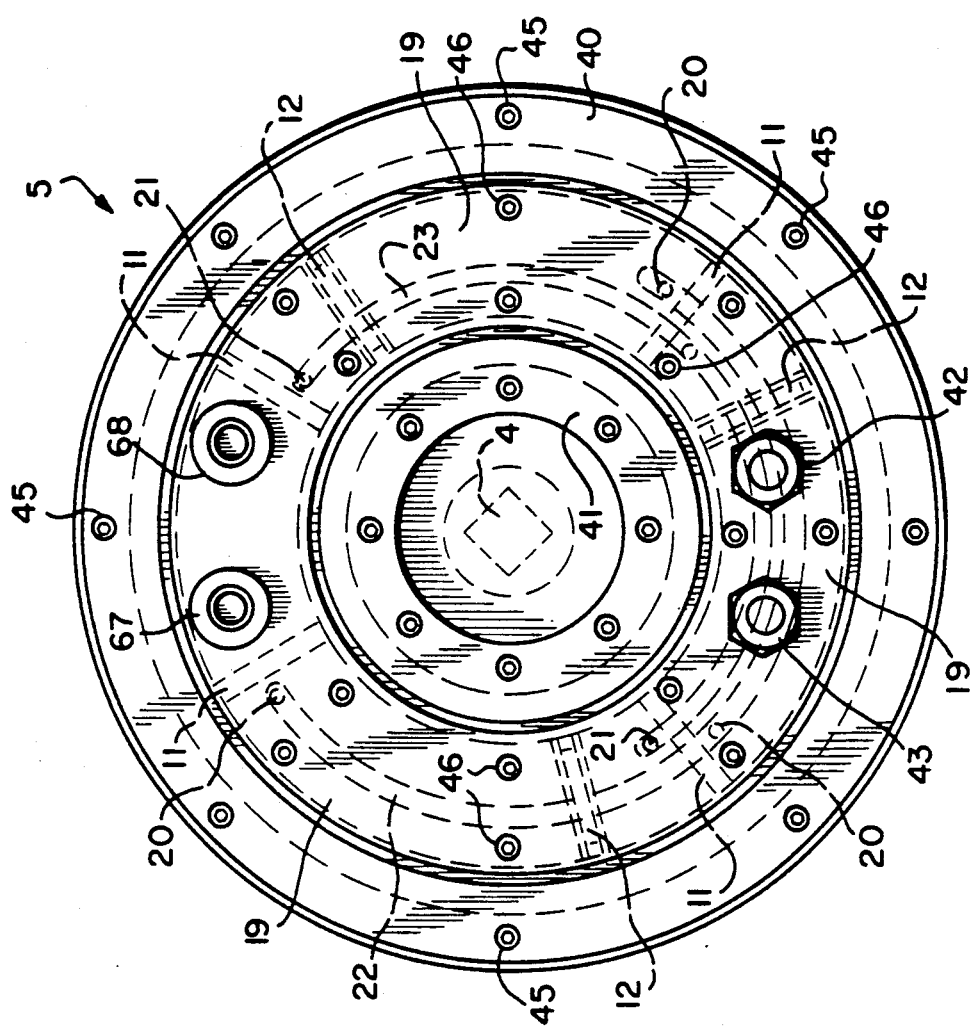
FIG. 4 is a bottom plan view of the rotary actuator shown in FIG. 3.

More specifically, cylindrical housing member 10 has a concentric outer and inner walls, 51 and 50 respectively, that define an annular space about the center of said housing. Three downwardly extending vanes 12 depending from the top of housing 10 are provided, which are radially positioned between outer and inner wall, 50 and 51 respectively, each vane being spaced apart at a predetermined distance with respect to one another. As will be seen from FIG. 2, each of the three depending vanes 12 is designed for insertion into respective rotary chambers 18 of chamber casing 14 where they function as rotary pistons for turning valve stem 4. As illustrated in FIG. 3, housing member 10 includes outer and inner walls 50 and 51, respectively, and depending vanes 12 as one mold injected article. However, as will be apparent to those skilled in the art, the outer and inner walls 50 and 51 and depending vanes 12 that make up the housing illustrated in the drawings can be separate elements connected or affixed to the top portion of housing 10 by any suitable means.

The annular chamber casing member 14 also has two concentric outer and inner wall, 60 and 61, respectively, designed to mate between the outer and inner walls 50 and 51 of housing 10 to receive depending vanes 12 (FIG. 3). In addition, four radially extending chamber walls 11 are provided which are interposed and attached to outer and inner walls 60 and 61 (see FIG. 2).

Thus, the housing 10, annular chamber casing 14, and chamber walls 11 define three rotary chambers 18 and one control chamber 14 when the housing 10 and chamber casing 14 are mated or fitted together. As with the housing 10, the annular chamber casing 14 shown in the drawings includes outer and inner walls, 60 and 61, and chamber walls 11 as an integral article. Each element may be separate parts that can be joined together by any suitable means.

It will be noted that chamber walls 11 are spaced apart with respect to each other to receive the correspondingly spaced depending vanes 12 for their arcuate oscillation within rotary chambers 18.

While the preferred embodiment illustrated in FIGS. 1 to 4 utilizes three depending vanes and a corresponding number of rotary chambers, any matched number of vanes and rotary chambers can be used to make up the actuator, according to the invention herein, so long as full oscillation of the depending vane within each respective chamber enables housing member 10 to operate stem 4 of ball valve 1, or other adjustable valve, from a completely open to a completely closed position, and vice versa. In this regard, the relative positioning of chamber walls 11 and depending vanes 12 is critical for the successful functioning of the rotary actuator set forth herein. The relationship between housing 10 and chamber casing 14 is also critical in that housing 10, and thus depending vanes 12, when operatively connected to stem 4 of ball valve 1, must be in the fully closed position when the ball valve is completely closed, and fully open when the ball valve is completely open.

At least one rotary chamber and depending vane is required for the actuator to function. As a practical matter, however, space and size requirements of both the actuator and the valve, as well as the torque demands required for operation of the adjustable valve under varying flow and working conditions, will play a role in determining the number of vanes and rotary chambers that make up the actuator. Increased torque demands for a given valve may be satisfied by simply increasing the number of depending vanes and rotary chambers in the actuator. This is one of the distinct advantages offered by the design of the actuator herein. It places the increased number of vanes in a parallel relationship with respect to each other so that they are additive in terms of the torque being applied to the valve stem. Thus, with all other parameters being identical, two depending vanes will double the torque generated by one vane, three depending vanes will triple the torque, and so forth.

Moreover, by increasing the distance from the center of the actuator, or the valve stem, to the depending vane (e.g., by increasing the diameter of the inner and outer walls of housing member 10 and chamber casing 14 by an equal amount), the torque exerted on the valve stem can be significantly increased as a result of the increase in length of the "lever arm". In addition, an increase in the surface area of the depending vane will also increase the torque, assuming a constant pressure being exerted on the vane by the pressurized fluid. This can be done by increasing the width or height of the depending vane, or both, which in turn will affect the height of and distance between, respectively, of the inner and outer walls of the housing member and chamber casing member. Accordingly, three different parameters can be used either individually or collectively for increasing or decreasing the torque output of the rotary actuator herein. Thus, the actuator of the present invention offers several design parameters and variables for accommodating the operational demands of an adjustable valve of any size and capacity. Most fire fighting vehicles use 2½ inch ball valves as the preferred valve in their lines to which the discharge hoses are connected.

Also positioned in each of rotary chambers 18 is a pair of openings 20 and 21 designed to selectively admit pressurized fluid, in this case pressurized hydraulic fluid, into and from the rotary chambers to oscillate the corresponding vanes 12 therein. Openings 20 and 21, which are positioned in the base of chamber casing 14, communicate with an annular distribution chamber 19 (FIG. 4) concentrically joined and sealed to the underside of the chamber casing by means of a series of screws 46 and an annular gasket 47, respectively. Distribution chamber 19 has a pair of concentric passages 22 and 23 designed to convey pressurized hydraulic fluid to and from rotary chambers 18 via openings 20 and 21, respectively. Passages 22 and 23 communicate with fluid couplings 42 and 43, respectively, said passages functioning as a means for operatively connecting hydraulic fluid lines A and B to the distribution chamber.

Thus, passage 22 serves as a conduit between hydraulic line A, by way of coupling 42 secured to distribution chamber 19, and each of the rotary chambers 18 through openings 20 for the flow of hydraulic fluid in either direction. In similar fashion, passage 23 serves as a conduit between hydraulic line B and each of the rotary chambers 18 by way of openings 21 also for the flow of hydraulic fluid in either direction.

Figure 3A:
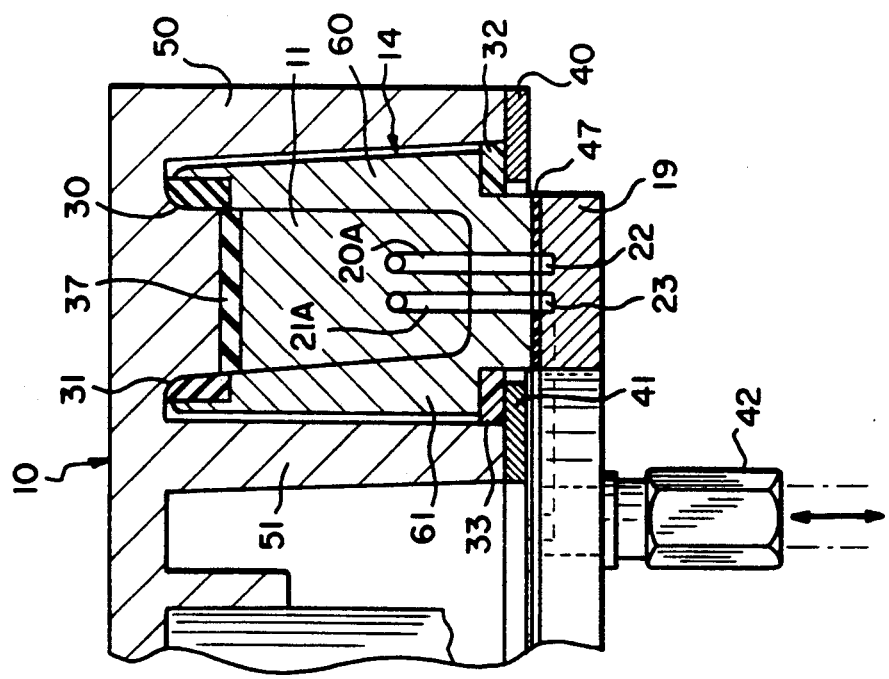
FIG. 3A is a vertical cross sectional view of an alternative embodiment of the rotary actuator set forth in FIG. 3.

It will be understood that openings 20 and 21 can be located anywhere within rotary chambers 18. For example, as illustrated in FIG. 3A, they can be made to communicate with a pair of passages 20A and 21A, respectively, within chamber walls 11 which in turn are operatively connected to concentric channels 22 and 23, so long as the openings are able to admit hydraulic fluid to and from rotary chambers 18 and so long as the hydraulic fluid, when under pressure, can move depending vanes 12 from one end of each of rotary chambers 18 to the other. Stated in another way, depending vanes 12 must be able to move in an arcuate fashion within their respective rotary chambers 18 in response to the admission and exit of hydraulic fluid to and from the rotary chambers 18 in order to open or close the adjustable valve, in this case ball valve 1.

Openings 20 and 21 can also be sized in such a way as to increase or decrease the rotational speed of depending vanes 12 given a set pressure of pressurized fluid within rotary chambers 18, thereby obtaining or controlling the period of time in which the valve can close or open. This is especially useful for incorporating a designed time damping effect into the valves used on fire fighting vehicles in which the valve can close to prevent unwanted back pressure forces within the water supply system when a hose line with a high rate of water flow is shut down by the immediate closing of the respective valve. The minimum amount of time adopted by the N.F.P.A. for closing or shutting down a valve on a fire fighting vehicle is at least three seconds. Accordingly, each of these openings can be designed to accommodate valve opening and closing speeds to match the requirements of the environment in which the valve is utilized.

Distribution chamber 19 described above is not limited to being fixed to the underside of chamber casing 14 for dispensing the pressurized fluid into rotary chambers 18. For example, the distribution chamber can be concentrically positioned and fixed to the top side of housing 10 to allow communication of pressurized fluid between channels 22 and 23 and openings 20 and 21, respectively. Openings 20 and 21 will of course have to be positioned in the top portion of housing 10 on either side of depending vanes 12 to allow full arcuate movement of the depending vanes within rotary chambers 18 without blocking or impeding the introduction of hydraulic fluid to and from said rotary chambers. This arrangement, however, will require that hydraulic lines A and B be flexible or that they be attached to a slip ring assembly to accommodate the oscillation of housing 10 when the actuator is in operation.

Positioned at the interface of housing 10 and chamber casing 14 of the actuator are two concentric ring seals 30 and 31, respectively (FIGS. 1 and 3), to keep these components separate from each other and also to contain the pressurized hydraulic fluid within rotary chambers 18. In like manner chamber walls 11 each have an appropriate seal 37 on their exposed edge to prevent leakage of hydraulic fluid from rotary chambers 18, i.e. from one chamber to the other. Each of depending vanes 12 also has an identical or appropriate seal 36 about their exposed edge to prevent the escape or transfer of hydraulic fluid from one side of the vane to the other.

For practical considerations, it is desirable that the choice of seals satisfy certain conditions. First, and as indicated above, the seals provided herein should offer a sufficient barrier to prevent the escape of pressurized fluid, e.g., hydraulic fluid, from the rotary actuator, and also between the rotary chambers. It should also prevent the transfer of pressurized fluid from one side of the depending vane to the other in the rotary chamber. Secondly, the seals must be compatible with the choice of pressurized fluid used to activate depending vane 12 within rotary chamber 18. As already indicated, the preferred medium of pressurized fluid for the actuator described in the figured drawings is a hydraulic fluid such as hydraulic oil, in which case the seals may be composed of an acrylonitrile-butadiene copolymer (such as Chemigum or Hycar available from BF Goodrich Co.; Krynac available from Polysar Corporation; or Paracril available from Uniroyal, Inc.), or brake fluid, in which case the seals can be made from an ethylene propylene terpolymer (such as Royalene available from Uniroyal, Inc.) In either case, nylon or teflon can be used. If air or gas is used as the medium for the pressurized fluid, then the seals should be pneumatically and chemically compatible with that medium. Thirdly, the seals should be configured in such a way as to produce a minimum of internal resistance to allow rotation of housing member 10 with respect to chamber casing 14. In all cases, compatibility implies that the sealing means contain the pressurized fluid within the actuator under operating conditions, as well as being resistant to any form of chemical or mechanical breakdown caused by the fluid in question.

As will be seen in FIG. 3, thrust bearings 32 and 33 are provided between housing retaining rings 40 and 41 and chamber casing 14 to facilitate the movement of housing 10 relative to chamber casing 14. As a preferred mode, the thrust bearings are in the form of a rigid polymer material that possesses the characteristics of resistance to cold material flow and compression when subjected to the high pressures exerted by housing 10 and chamber casing 14 caused by the pressurized fluid, and also possesses the quality of an inherent lubricity to provide a practically friction free surface for the movement of housing 10. Preferred polymers are teflon or a high density polyethylene compound It will be apparent to those skilled in the art that other thrust bearing means can be utilized that will accomplish the purposes set forth above without departing from the scope of the invention herein.

Housing 10 and chamber casing 14 are held together by a pair of concentric retaining rings 40 and 41 with screw fastening means 45 positioned throughout each of the retaining rings. It will be understood that the fastening means 45 for retaining rings 40 and 41 should be of sufficient number and strength to withstand and contain the pressure that is exerted by the pressurized fluid within rotary chambers 18.

In operation, pressurized hydraulic fluid is fed to either hydraulic line A or B to activate depending vanes 12, which as noted hereinbefore, function as rotary pistons inside rotary chambers 18. The arcuate movement of the depending vanes, and hence the rotational movement of housing 10, causes valve stem 4 to rotate, which in turn controls the opening and closing of ball valve 1. Thus, if line A is caused to be pressurized from a source of pressurized hydraulic fluid, the hydraulic fluid will enter passage 22 of distribution chamber 19 and each of the rotary chambers 18 by way of openings 20. The pressurized hydraulic fluid will then cause depending vanes 12 to move in a clockwise direction resulting in the rotation of valve stem 4 in the same direction to close ball valve 1. Hydraulic fluid already present in chambers 18 will be forced to return to line B (which has been depressurized) by way of openings 21 and passage 23.

Conversely, when line B is pressurized (and line A is depressurized), hydraulic fluid will enter passage 23 and into rotary chambers 18 by way of openings 21, which will then cause depending vanes 12 to move in a counterclockwise direction, thereby simultaneously rotating valve stem 4 in an opposite or counterclockwise direction to open ball valve 1. Hydraulic fluid already present in rotary chambers 18 will then be forced to return through line A via openings 20 and passage 22. The function of opening and closing ball valve 1 to any position is thereby accomplished.

The Valve Control System

Figure 6:
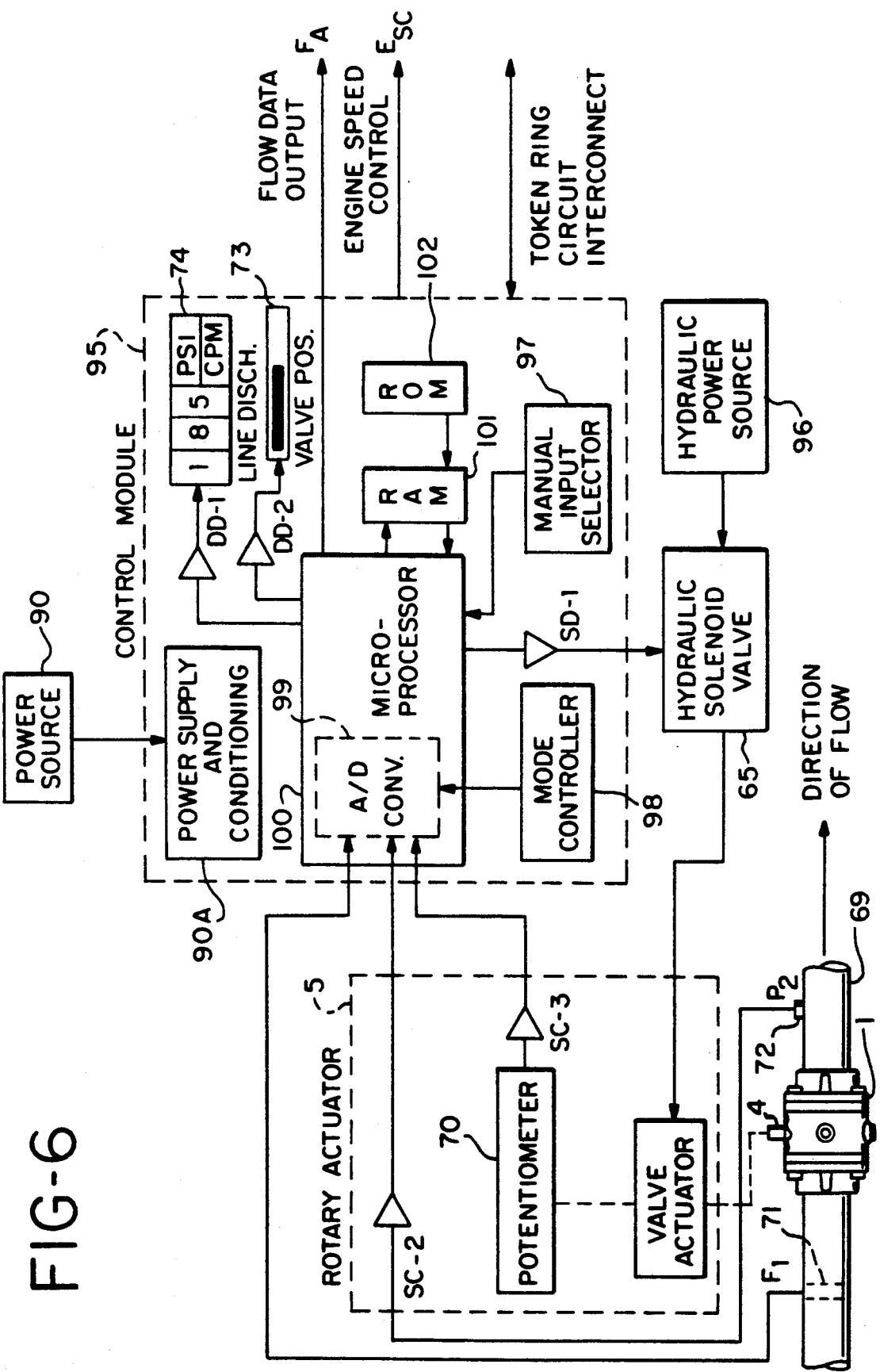
FIG. 6 is an electrical schematic of the control module and system for controlling the ball valve shown in FIG. 5.

The valve control system according to the invention can best be described by referring to the schematic drawings illustrated in FIGS. 5, 6 and 7.

FIG. 5 illustrates a valve control system adapted for use on a fire fighting vehicle that generates a flow of water from a discharge pump on the vehicle (not shown) through a hose line or conduit 69 employing ball valve for the control or regulation of water therethrough. Thus, rotary actuator 5 is operatively connected to stem 4 of ball valve 1 along with a position feedback circuit 91 operatively connected to a potentiometer 70 within control chamber 24 (FIG. 2) for conveying a feedback signal via connector 67 to a control module 95 within a control panel (not shown). The feedback signal is generated by a position sensor in the form of a potentiometer 70 within actuator 5 to reflect the actual position of the actuator, and hence the ball valve.

Hydraulic lines A and B are connected between the actuator 5 and a solenoid valve 65, to convey pressurized hydraulic fluid to and from the actuator 5 in response to an output signal received by the solenoid valve 65 from the control module 95 via a transmission circuit 94. Thus, solenoid valve 65 distributes the hydraulic fluid from a hydraulic power source 96 to lines A or B according to the direction and duration of the output signal received.

In addition, a feedback circuit 92 is interposed between ball valve 1 and control module 95 via connector 68 to transmit a pressure response signal from a pressure sensing means 72, in this case a resistive strain gauge pressure transducer, that is capable of producing a signal reflective of the water pressure in conduit 69 downstream of ball valve 1. A similar circuit 93 is provided for transmitting a flow response signal from a flow transducer 71, such as that incorporated in the Flowminder series of flowmeters manufactured by Span Instruments, Inc., to control module 95 that is reflective of the water flow rate in conduit 69.

FIG. 6 is a functional block diagram of the valve control system illustrated in FIG. 5, incorporating a microprocessor-based control module 95 within the control panel (not shown) in accordance with the present invention. It will be appreciated that microprocessor 100 is one that contains sufficient control electronics as configured by suitable control programming which will be evident to those skilled in the art, as well as means for processing, comparing and storing each of the signals it receives, and generating the appropriate output signals to accomplish the functions described herein. An example of such a microprocessor is available from the Motorola Corporation with a designation MC68HC11. The specific circuitry for microprocessor 100 is not set forth in FIG. 6 for purposes of simplicity.

Referring to FIG. 6, a power source 90, which is usually a 12V dc battery source generally available on the fire fighting vehicle, is provided to activate control module 95. Because different operating and reference voltages are required to power the electronics within control module 95, a multi-voltage power supply 90A is incorporated as a part of the control module, along with a conditioning means, to remove or filter any extraneous electrical noise and voltage spikes that might occur during operation of the fire fighting vehicle.

As part of control module 95, microprocessor 100 is provided to receive outputs from manual input selector 97 and mode controller 98 for selecting the mode of operation for the valve control system and desired value for each mode, respectively. An analog/digital convertor 99 is also provided to receive the analog signals generated from position sensor 70, pressure transducer 72 and water flow transducer 71, and convert them to digital signals for comparison with the output received from mode controller 98.

Microprocessor 100 is coupled with a random access memory (RAM) function 101 and read only memory (ROM) function 102 to receive the necessary input for processing, comparing, and storing each of the signals the microprocessor receives and to make the appropriate calculations and generate the resulting outputs to solenoid valve 65 for controlling the flow of hydraulic fluid from hydraulic power source 96 to rotary valve actuator 5 via hydraulic lines A and B. RAM 101 and ROM 102 also provide information to the microprocessor to enable it to generate the appropriate output for reflecting the position of ball valve 1 to a liquid crystal bar graph 73, and the appropriate output for reflecting the downstream water pressure signal $P_2$ and water flow rate signal $F_1$ to a digital display monitor 74.

Operation of the valve control system is initiated by making a manual selection of one of three modes of operation via the manual input selector 97, which generates an appropriate input signal to microprocessor 100 for the ball valve position, water pressure (downstream of the ball valve 1) or water flow rate. Assuming the valve position mode is selected, a setting for the desired position of the valve opening is made via a selector L (FIG. 5) within mode controller 95 which generates a desired position input to the A/D convertor 99 of microprocessor 100. Concurrently, a multiple turn potentiometer 70 positioned within control chamber 24 of rotary actuator 5 (FIG. 2), operates to generate a valve position signal that is amplified, filtered and compensated for transducer changes via signal conditioner SC-3 which in turn is input to microprocessor 100 via transmission circuit 91. The position transmitter signal reflects the actual position of housing 10 of the rotary actuator and hence the degree of opening of ball valve 1.

The multiple turn potentiometer 70, that is, one that has a revolution of greater than 360°, is coupled through a drive capstan (not shown) to make contact with outer wall 50 through an opening (not shown) in outer wall 60 of chamber casing 14 adjacent to control chamber 24. For a less sensitive resolution, a single turn potentiometer may be coupled to inner wall 51 of housing member 10 through an opening (not shown) in outer wall 61 of chamber casing 14. Other alternatives for sensing the position of housing 10 relative to chamber casing 14, and hence the position of ball valve 1, are available which will be apparent to those persons skilled in the art, including, but not limited to, the use of a rotary encoder or encoded relative position sensing devices.

Using an algorithm programmed into external RAM function 101 for microprocessor 100, the microprocessor compares the ball valve position transmitter signal with the selected ball valve position input signal and issues a resulting output control signal that is fed through solenoid driver SD-1 and into solenoid valve 65. This output signal causes solenoid valve 65 to supply hydraulic fluid from a hydraulic power source 96 (FIG. 5) to the valve actuator 5 thereby causing the valve to be positioned in response to the output control signal, or until the position of the actuator, and hence the valve, is identical to the ball valve position selected by mode controller 98. For example, when the mode controller is set for a position of one half, the valve position will be half way open. A valve position display situated on control module 95, in this case in the form of a liquid crystal bar graph 73, tracks the position transmitter signal input to the microprocessor via a signal fed to display driver DD-2 and continuously portrays the ball valve position so that visual observation is available at all times. Remote control and monitoring of ball valve 1 is therefore accomplished by operation of actuator 5 as a function of the position sensing means contained therein.

Control of rotary actuator 5 and ball valve 1 as a function of the water pressure downstream of ball valve 1 in conduit 69 is accomplished by selecting the water discharge pressure mode via the manual input selector 97. The setting for the desired water pressure in conduit 69 is made through mode controller 98 which generates a pressure input $P_S$ to A/D convertor 99 within microprocessor 100. A pressure transducer 72 located within conduit 69 simultaneously generates and transmits an output signal $P_2$ reflective of the actual water pressure which is fed to signal conditioner SC-3 and then to A/D convertor 99 within microprocessor 100 via transmission circuit 92 (FIG. 5). Again, the microprocessor compares both of the outputs from pressure transducer 72 and the pressure mode controller setting $P_S$, and generates and issues a control output signal that is transmitted through solenoid driver SD-1 and into the solenoid control valve 65. The control output signal will again cause solenoid valve 65 to supply hydraulic fluid from hydraulic power source 96 to valve actuator 5 thereby causing ball valve 1 to be adjusted in response to the control output signal.

Once the A/D convertor 99 receives the output signal from pressure transducer 72, microprocessor 100 provides a digital data output signal based thereon which is fed through display driver DD-1 and into digital display monitor 74 for portraying the $P_2$ pressure signal in numerical form, for example in pounds per square inch (PSI). Microprocessor 100 is also programmed through RAM function 101, to continuously display, if requested, the numerical expression of the $P_2$ water pressure when the manual input selector and mode controller are in the valve position mode or water flow rate mode, since pressure transducer 72 will always be in operation simultaneously with these modes. Accordingly, remote control and monitoring of ball valve 1 is accomplished by operation of rotary actuator 5 as a function of the downstream water pressure in conduit 69.

As an optional embodiment, the engine speed for the fire fighting vehicle, which powers the water pump and supplies water pressure to the various hose lines or conduits, can also be made to operate as a function of the downstream water pressure $P_2$ signal by means of an engine speed control signal received from the control module for any given ball valve operating on the vehicle. This is accomplished by the provision of an engine speed control output signal $E_{SC}$ which is generated by the microprocessor based on the comparison of the $P_2$ pressure signal received from pressure transducer 72 and the selected pressure setting input signal $P_S$ generated by mode controller 98.

As will be seen in FIG. 7, output signal $E_{SC}$ is transmitted from control module 95 to a signal selector 110 of an interface module 108 where it is forwarded to the engine speed controller (not shown) of the vehicle for either speeding up or slowing down the engine speed as $P_2$ increases or drops during employment of the respective hose line. For example, as $P_2$ increases and approaches the pressure setting $P_S$ selected for the mode controller 98 after ball valve 1 has been activated, the value for the engine speed control signal $E_{SC}$ will decrease thereby causing the engine speed of the fire fighting vehicle to slow down in response to the decreasing increment between pressure signals $P_S$ and $P_2$. The reverse is true if the $P_2$ pressure signal should fall off or drop for any reason, for example if the nozzle of the hose line is opened to a greater degree.

When multiple hose lines are employed during operation of the fire fighting vehicle, and thus a corresponding number of valves and control modules, the engine speed control output signals $E_{SC-N}$ from each control module $95_N$ are transmitted to signal selector 110 where the signals are compared. The signal requiring the highest vehicle engine speed $E_F$ is chosen by the signal selector for transmission to the engine speed control means. In this way, the water pressure demands of each valved hose line are fulfilled. The advantage of the invention's provision of this automated control feature for the vehicle engine speed, and in turn the vehicle's water discharge pump, is that fuel consumption is made more efficient along with reduced maintenance for the vehicle engine and discharge pump.

Another aspect of the valve control system provides for the automatic closing of ball valve 1 when there is a sudden drop in water pressure downstream of the valve. For example, if a hose line ruptures or becomes uncoupled during operation of the fire fighting vehicle, the system described thus far will cause microprocessor 100 to generate and transmit an output control signal, reflective of the difference between the $P_2$ and $P_S$ signals, through solenoid driver SD-1 and into solenoid valve 65 for instructing actuator 5 to open ball valve 1 to increase the water flow, and hence the water pressure, through conduit 69. The operator therefore becomes exposed to personal injury as the result of an uncontrolled hose line.

To address this circumstance, a command is generated by microprocessor 100 to generate and transmit an output control signal that will effectively close ball valve 1 (instead of opening it) when there is loss of downstream water pressure in a preset period of time. Microprocessor 100 will receive the decreased $P_2$ signal value via A/D convertor 99 within the preset time period and will instruct solenoid valve 65, via a generated output control signal, to pressurize line A for operating rotary actuator 5 in a clockwise direction for closing ball valve 1. Automatic shutdown of a ruptured or uncoupled hose line while in operation is thereby accomplished.

The last mode of operation, the water flow rate mode, operates in the same manner as the water discharge pressure mode except that actuator 5 and ball valve 1 are made to operate as a function of an output signal generated by a flow transducer 72 positioned in conduit 69. Assuming that ball valve 1 is in a closed positioned, the manual input selector 97 is set for the water flow rate mode and a desired flow rate setting is selected via mode controller 98 which generates a corresponding flow rate input signal $F_S$ to A/D convertor 98 of microprocessor 100. Flow transducer 71 also generates an output signal $F_1$ reflective of the actual water flow rate in conduit 69 upstream of ball valve 1 (in this case, a zero flow rate is registered) and transmits the $F_1$ output signal via transmission circuit 93 directly to A/D convertor 99 of the microprocessor where it is compared with the desired flow rate input signal $F_S$ from mode controller 98. Microprocessor 100 then generates a corresponding output control signal that is fed once again through solenoid driver SD-1 and into solenoid valve 65, which in turn causes the hydraulic fluid from hydraulic power source 96 to be fed through hydraulic line B (FIG. 5) into rotary chambers 18 of actuator 5 to move depending vanes 12 in an arcuately counterclockwise direction to open ball valve 1 in a manner that is continuously monitored by the microprocessor. Ball valve 1 is thereby remotely controlled to an opened position until the desired flow rate, as reflected by the $F_S$ signal, is achieved. Additionally, and so long as the desired flow rate setting stays the same, the desired water flow rate in conduit 69 will be maintained.

As with the numerical display of the downstream water pressure signal $P_2$, microprocessor 100 generates a digital data output signal, in response to the water flow rate $F_1$ signal, and transmits this output signal through display driver DD-1 and into digital display monitor 74 for portraying the $F_1$ flow rate in numerical form, such as in gallons per minute (GPM) illustrated in FIG. 6. The commands supplied from microprocessor 100 enable the actual water flow rate to be displayed whenever the water flow rate mode is selected, or alternatively if a request is entered by the operator to view the water flow rate via manual input selector 97.

Another aspect of the valve control system according to the present invention is that control module 95 is enabled, through an appropriate algorithm contained in RAM function 101, to generate a flow data output signal $F_A$ reflective of the total output of water having passed through conduit 69. Like the digital data output signal, the $F_A$ output is derived from the $F_1$ flow rate signal generated by flow transducer 72 in conduit 69. The $F_A$ signal is then transmitted to a digital accumulator 112 within interface module 108 (shown in FIG. 7) that will numerically accumulate the water flow rate from control module 95. A similar signal $F_{A-N}$ is received from each control module $95_N$ by digital accumulator 112 for accumulating and summing the flow rate outputs from each hose line being employed on the fire fighting vehicle. The resulting value is transmitted through display driver DD-3 and into a digital accumulator display monitor 114 to provide the operator of the valve control system herein with a display of total water flow rates at any given time.

Digital accumulator 112 will also generate and transmit a signal reflective of the total volume of water through the fire fighting vehicle's hose lines in response to a signal received from a manual input function 116. By programming each of control modules 95 through $95_N$ in this fashion, a total volume of water that is being pumped from the fire fighting vehicle at any given time can be displayed via monitor 114.

It will be understood that a separate control module will be assigned to each ball valve, and that the control module or ball valve may be located or positioned anywhere on the fire fighting vehicle. This allows the operation of any of the ball valves to be unimpeded by previously imposed mechanical linkage restrictions. In addition, each module will preferably be incorporated into one centrally and conveniently located control panel assembly on the fire fighting vehicle in order that the multiple lines or fire hoses can be administered to from that location. Thus, a control panel will comprise at least one control module, and generally a plurality of control modules, for regulating the respective valve(s) on the fire fighting vehicle.

A plurality of control panels can optionally be positioned about the fire fighting vehicle at convenient or strategic locations to properly insure convenience an safety during operation of the water pumping facility. In order to accommodate this option, appropriate electronics, such as a token ring circuit interconnect means, is provided between each control panel that will enable operation and control of all of the valved lines on the vehicle from each control panel. Thus, each hydraulic control valve, or solenoid valve, and respective actuator and ball valve will be able to receive the appropriate output control signal from its associated microprocessor through any selected control panel no matter where it is situated on the fire fighting vehicle.

The valve control system described herein for use on a fire fighting vehicle insures that the vehicle can operate in an efficient and safe manner. A fully independent control module for each valved line also insures that an failure of any one component will affect no more than one line. Moreover, the use of low pressure hydraulics and well proven solid state electrical components assures total system reliability.

In the event that the valve control system is shut down or powered off for any reason, solenoid valve 65 will resort to a neutral position thereby deactivating the hydraulic pressure in rotary actuator 5. Ball valve 1 can then be manually operated by the provision of three triangularly positioned studs on the top of housing 10 (not shown) to accommodate the use of a standard fireman's hose spanner wrench. Alternatively, the stem 4 of ball valve 1 can be extended through an appropriate opening in the top portion of housing 10 (not shown) to facilitate the attachment of a standard valve operating lever for manually opening and closing the valve.

As noted above, the invention has been referred to in the general context of an actuator controlled valve and valve control system for use on a fire fighting vehicle to regulate the flow of water when the vehicle is in operation, but it will be apparent to those skilled in the art that the invention may be used in other contexts and applications as may be appropriate without departing from the scope of the invention herein. Moreover, since other modifications and changes may be varied to fit particular operating requirements and environments, as also will be apparent to those skilled in the art, the invention is not considered to be limited to the specific embodiments chosen for the purposes of disclosure, and covers all changes and modifications which do not constitute departures from the true spirit and scope of this invention.

What is claimed is

1. An oscillatory rotary device for actuating an adjustable valve comprising:
 a) a freely rotating, cylindrical housing having
   i) a concentric outer wall and inner wall defining an annular space about the center of said housing;
   ii) at least one depending vane radially positioned between said inner and outer walls; and
   iii) means for operatively connecting said housing to the stem of said adjustable valve;
 b) an annular chamber casing having
   i) two concentric walls for mating between the inner and outer walls of said housing and adapted to receive said depending vane between said concentric walls; and
   ii) at least one radially extending chamber wall interposed and attached to said concentric walls, said housing, chamber casing and chamber wall defining at least one rotary chamber for the arcuate movement of said depending vane therein, said rotary chamber having a pair of openings for selectively admitting pressurized fluid into and from said rotary chamber to arcuately oscillate the vane therein;
 c) means for fixing said chamber casing with respect to said valve; and
 d) retaining means for containing said chamber casing within said housing to provide a rotary actuator having a least one fluid pressurized rotary chamber.

2. The oscillatory rotary device defined in claim 1 further comprising:
 a) sealing means disposed at the interface of said housing and said chamber casing to prevent the escape and transfer of pressurized fluid contained therein b) sealing means disposed about the edge of said chamber wall to prevent the transfer of pressurized fluid from one side of said chamber wall to the other;

c) sealing means disposed about the edges of said depending vane to prevent the transfer of pressurized fluid from one side of said vane to the other; and d) bearing means disposed at the interface of said retaining means and said chamber casing to facilitate the movement of said housing with respect to said chamber casing.

3. The oscillatory rotary device defined in claim 2 further comprising a pair of conduit means communicating with the respective openings in said rotary chamber and a source of pressurized fluid for arcuately oscillating said vane in said rotary chamber.

4. The oscillatory rotary device defined in claim 3 wherein the pair of openings is positioned in the base of said chamber casing for selectively admitting pressurized fluid into and from said rotary chamber to arcuately oscillate the depending vane therein.

5. The oscillatory rotary device defined in claim 3 wherein the pair of openings is positioned in said chamber wall for selectively admitting pressurized fluid into and from said rotary chamber to arcuately oscillate said depending vane therein.

6. The oscillatory rotary device defined in claim 3 wherein said fluid comprises hydraulic fluid.

7. The oscillatory rotary device defined in claim 3 wherein said fluid comprises brake fluid.

8. The oscillatory rotary device defined in claim 3 wherein said fluid comprises air.

9. The oscillatory rotary device defined in claim 1 wherein said adjustable valve comprises a ball valve.

10. The oscillatory rotary device defined in claim 1 wherein said adjustable valve comprises a butterfly valve.

11. An oscillatory rotary device for actuating an adjustable valve comprising:

a) a freely rotating, cylindrical housing having
   i) a concentric outer wall and inner wall defining an annular space about the center of said housing;
   ii) a plurality of depending vanes radially positioned between said inner and outer walls and arcuately spaced apart from one another at a predetermined distance; and
   iii) means for operatively connecting said housing to the stem of said adjustable valve;

b) an annular chamber casing having
   i) two concentric walls for mating between the inner and outer walls of said housing and adapted to receive said depending vanes between said concentric walls, and
   ii) a plurality of radially extending chamber walls interposed and attached to said concentric walls, said housing, chamber casing and chamber walls defining a plurality of rotary chambers for receiving one depending vane per rotary chamber for the arcuate oscillation of said depending vanes therein, each of said rotary chambers having a pair of openings for selectively admitting pressurized fluid into and from said rotary chambers to arcuately oscillate the vanes therein;

c) a fluid distribution chamber operatively connected to said rotary actuator, said distribution chamber having a pair of concentric channels communicating respectively with each pair of openings in said rotary chambers and a source of pressurized fluid for arcuately oscillating said vanes in said rotary chambers;

d) means for fixing said chamber casing with respect to said valve; and e) retaining means for containing said chamber casing within said housing to provide a rotary actuator having a plurality of fluid pressurized rotary chambers.

12. The rotary actuator defined in claim 11 further comprising (a) sealing means disposed at the interface of said housing and said chamber casing to prevent the escape or transfer of pressurized fluid contained therein;

b) sealing means disposed about the edge of said chamber walls to prevent the transfer of pressurized fluid from one rotary chamber to the other;

c) sealing means disposed about the edges of said depending vanes to prevent the transfer of pressurized fluid from one side of the vanes to the other; and d) bearing means disposed at the interface of said retaining means and said chamber casing to facilitate the oscillatory movement of the housing member with respect to the chamber casing member.

13. The oscillatory rotary device defined in claim 12 wherein said fluid distribution chamber has an annular configuration concentrically joined to the underside of said chamber casing.

14. The oscillatory rotary device defined in claim 13 wherein said pair of openings is positioned in the base of said chamber casing.

15. The oscillatory rotary device defined in claim 13 wherein said pair of openings is positioned in said chamber walls.

16. The oscillatory rotary device defined by claim 13 further comprising an additional radially extending wall interposed between and attached to the concentric walls of said chamber casing and spaced apart at a predetermined distance from an adjacent chamber wall, to form a control chamber within said chamber casing, said control chamber adapted to contain a means for monitoring the position of said housing and hence the position of said valve.

17. The oscillatory rotary device defined by claim 16 wherein said housing comprises three depending vanes.

18. The oscillatory rotary device defined by claim 11 wherein said fluid comprises hydraulic fluid.

19. The oscillatory rotary device defined by claim 11 wherein said fluid comprises brake fluid.

20. The oscillatory rotary device defined by claim 11 wherein said fluid comprises air.

21. The oscillatory rotary device defined by claim 11 wherein said adjustable valve comprises a ball valve.

22. The oscillatory rotary device defined by claim 11 wherein the adjustable valve comprises a butterfly valve.

23. In combination, a) a freely rotating, cylindrical housing comprising
   i) a concentric outer wall and inner wall defining an annular space about the center of said housing;
   ii) at least one depending vane radially positioned between said inner and outer walls; and
   iii) means for operatively connecting said housing to an apparatus requiring rotary actuation;

b) an annular chamber casing comprising
  i) two concentric walls for mating between the inner and outer walls of said housing and adapted to receive said depending vane between said concentric walls; and
  ii) at least one radially extending chamber wall interposed and attached to said concentric walls, said housing, chamber casing and chamber wall defining at least one rotary chamber for the arcuate movement of said depending vane therein, said rotary chamber having a pair of openings for selectively admitting pressurized fluid into and from said rotary chamber to arcuately oscillate the vane therein;
c) means for statically fixing said chamber casing member relative to said housing; and
d) retaining means for containing said chamber casing within said housing.

24. The apparatus defined in claim 23 further comprising:
a) sealing means disposed at the interface of said housing and said chamber casing to prevent the escape and transfer of pressurized fluid contained therein;
b) sealing means disposed about the edge of said chamber wall to prevent the transfer of pressurized fluid from one side of said chamber wall to the other;
c) sealing means disposed about the edges of said depending vane to prevent the transfer of pressurized fluid from one side of the vane to the other; and
d) bearing means disposed at the interface of said retaining means and said chamber casing to facilitate the movement of said housing relative to said chamber casing.

25. A system for controlling an adjustable valve in a conduit comprising:
a) the oscillatory rotary device defined in claim 3 for controlling the operation of said valve;
b) feedback means for generating a feedback signal reflective of the actual position of said rotary device;
c) a control module comprising:
  i) means for generating a reference signal that is reflective of a predetermined position setting for said valve;
  ii) processing means for generating a comparison signal in response to said feedback signal, said comparison signal being representative of the difference between said feedback signal and said reference signal; and
  iii) means for transmitting said comparison signal to a regulating means for controlling the flow of fluid from a pressurized fluid source to said rotary device.

26. The system defined by claim 24 wherein said processing means additionally generates an output signal reflective of the valve position in said conduit for visually displaying said valve position.

27. The system defined by claim 25 wherein said reference signal is reflective of a predetermined fluid pressure setting in said conduit, and said feedback means comprises a pressure sensing device disposed in the conduit downstream of said adjustable valve, said pressure sensing device being capable of generating a signal that is reflective of the fluid pressure in said conduit.

28. The valve control system defined by claim 27 wherein said processing means additionally generates an output signal reflective of the fluid pressure downstream of said valve for visually displaying said fluid pressure.

29. The system defined by claim 27 wherein said processing means additionally generates an output control signal, reflective of said comparison signal, to said regulating means for moving said valve to a closed position when said comparison signal increases by a predetermined amount in a predetermined period of time.

30. The system defined by claim 25 wherein said reference signal is reflective of a predetermined fluid flow rate setting in said conduit, and said feedback means comprises a flow sensing device capable of generating a signal that is reflective of the fluid flow rate through said conduit.

31. The system defined by claim 30 wherein said processing means additionally generates an output signal reflective of the fluid flow rate in said conduit for visually displaying the fluid flow rate.

32. The system defined by claim 30 wherein said processing means additionally generates an output signal, reflective of the fluid flow rate signal generated by said flow sensing device, for visually displaying the total fluid output through said conduit.

33. The system defined by claim 25 wherein said adjustable valve comprises a ball valve.

34. The system defined by claim 25 wherein said processing means is a microprocessor.

35. The system defined by claim 25 wherein said adjustable valve comprises a butterfly valve.

36. The system defined by claim 25 wherein said regulating means comprises a solenoid valve.

37. The system defined by claim 25 wherein said position feedback means comprises a potentiometer.

38. A system for the control of fluid through a plurality of conduits on a fire fighting vehicle comprising:
a) an adjustable valve disposed in each conduit; and
b) a system for controlling each adjustable valve as defined by claim 25, said control module for each valve being operatively integrated with a panel disposed at a single location on said fire fighting vehicle for controlling each of said valves therefrom.

39. A system for the control of fluid through a plurality of conduits on a fire fighting vehicle comprising:
a) an adjustable valve disposed in each conduit; and
b) a system for controlling each adjustable valve as defined by claim 27, said control module for each valve being operatively integrated with a panel disposed at single location on said fire fighting vehicle for controlling each of said valves therefrom.

40. A system for the control of fluid through a plurality of conduits on a fire fighting vehicle comprising:
a) an adjustable valve disposed in each conduit; and
b) a system for controlling each adjustable valve as defined by claim 30, said control module for each valve being operatively integrated with a panel disposed at a single location on said fire fighting vehicle for controlling each of said valves therefrom.

41. The system for controlling each adjustable valve defined by claim 39 wherein said processing means additionally generates an output signal, reflective of said comparison signal, for controlling the engine speed of said fire fighting vehicle.

42. A system for the control of a fluid through a plurality of conduits defined by claim 38 further comprising an interconnect circuit means operatively connected to a plurality of said panels for controlling said valves from each control panel.

43. A system for the control of a fluid through a plurality of conduits defined by claim 39 further comprising an interconnect circuit means operatively connected to a plurality of said panels for controlling said valves from each control panel.

44. A system for the control of a fluid through a plurality of conduits defined by claim 40 further comprising an interconnect circuit means operatively connected to a plurality of said panels for controlling said valves from each control panel.

* * * * *